United States Patent [19]

Engel

[11] 4,287,005
[45] * Sep. 1, 1981

[54] INSTANTANEOUS SCARFING BY MEANS OF A PILOT PUDDLE

[75] Inventor: Stephen A. Engel, Granite Springs, N.Y.

[73] Assignee: Union Carbide Corporation, New York, N.Y.

[*] Notice: The portion of the term of this patent subsequent to Jan. 6, 1998, has been disclaimed.

[21] Appl. No.: 121,606

[22] Filed: Mar. 4, 1980

Related U.S. Application Data

[63] Continuation-in-part of Ser. No. 91,162, Nov. 5, 1979, Pat. No. 4,243,436, which is a continuation of Ser. No. 24,597, Mar. 28, 1979, abandoned.

[51] Int. Cl.³ .................................................. B23K 7/00
[52] U.S. Cl. ...................................... 148/9.5; 266/51; 266/53
[58] Field of Search ...................... 148/9.5; 266/51, 53

[56] References Cited

U.S. PATENT DOCUMENTS

| | | | |
|---|---|---|---|
| 3,231,431 | 1/1966 | Allmang | 148/9.5 |
| 3,455,747 | 7/1969 | Lytle | 148/9.5 |
| 3,752,460 | 8/1973 | Lytle | 148/9.5 |
| 3,966,503 | 6/1976 | Engel | 148/9.5 |
| 3,991,985 | 11/1976 | Engel | 266/51 |
| 4,013,486 | 3/1977 | Engel | 148/9.5 |
| 4,038,108 | 7/1977 | Engel et al. | 148/9.5 |
| 4,040,871 | 8/1977 | Engel | 148/9.5 |
| 4,103,877 | 8/1978 | Pfeuffer | 266/51 |
| 4,115,154 | 9/1978 | Fuhrhop | 148/9.5 |
| 4,243,436 | 1/1981 | Engel | 266/53 |

FOREIGN PATENT DOCUMENTS

53-84850 7/1978 Japan.
373057 1/1975 Sweden.

*Primary Examiner*—L. Dewayne Rutledge
*Assistant Examiner*—John P. Sheehan
*Attorney, Agent, or Firm*—John J. Kelly, Jr.

[57] ABSTRACT

A method for spot scarfing a metal workpiece comprising continuously producing a pilot puddle on the surface of the workpiece, spreading the pilot puddle to a preselected width with a high intensity stream of oxygen gas, and impinging a stream of scarfing oxygen gas on the spread puddle and an apparatus to practice same.

23 Claims, 11 Drawing Figures

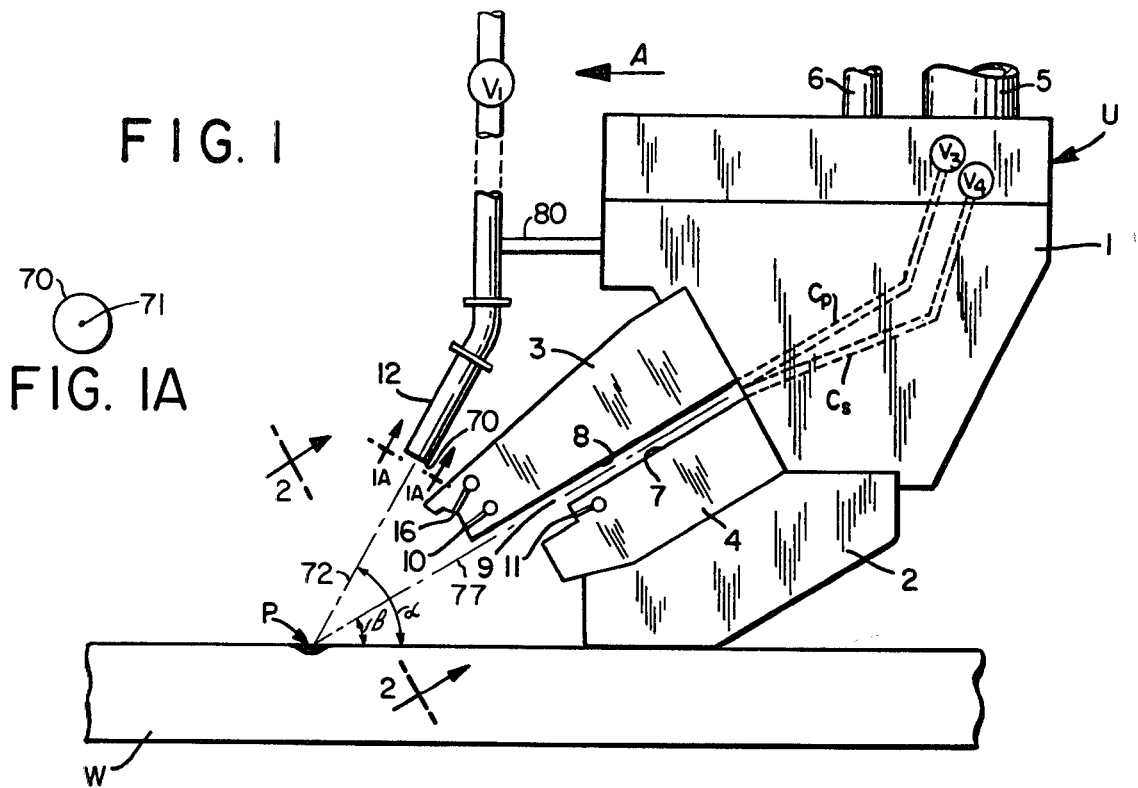
FIG. 1
FIG. 1A
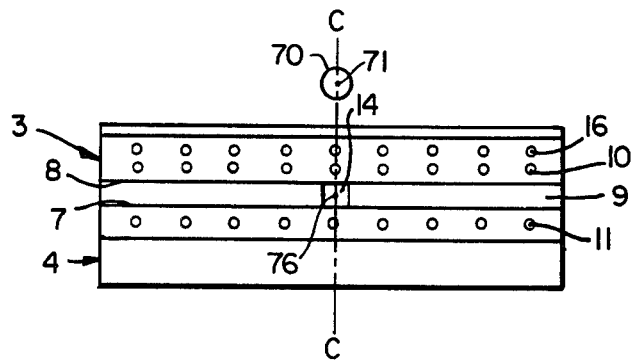
FIG. 2
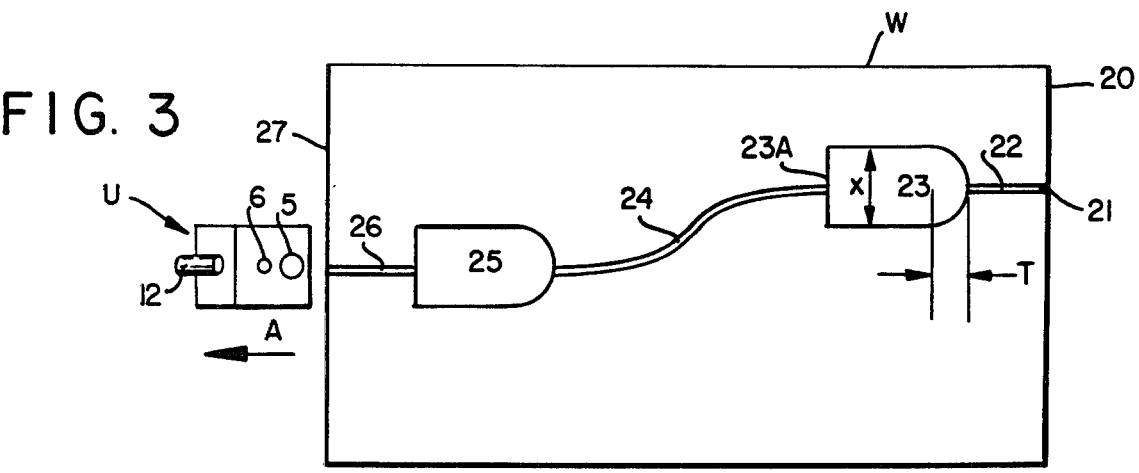
FIG. 3

INSTANTANEOUS SCARFING BY MEANS OF A PILOT PUDDLE

This application is a continuation-in-part of my prior U.S. application: Ser. No. 091,162, Filing Date: Nov. 5, 1979, now U.S. Pat. No. 4,243,436 which is a continuation of my prior U.S. applicaton; Ser. No. 024,597, Filing Date: Mar. 28, 1979 now abandoned.

BACKGROUND

This invention relates to the scarfing of metal workpieces wherein defects on the surface of a workpiece are removed by a stream of scarfing oxygen gas. More specifically, this invention relates to a method and apparatus for spot scarfing one or more areas of the workpiece surface while the scarfing apparatus and workpiece are in motion relative to each other at normal scarfing speed.

Scarfing cuts are conventionally started by first preheating a band of metal on the surface of a workpiece to its oxygen-ignition temperature. The width of the band is normally equal to the width of the desired scarfing cut. A stream of scarfing oxygen is then impinged upon the preheated band and relative movement is provided between the scarfing oxygen stream and the workpiece, thereby producing the desired scarfing cut. During the preheating step of such a conventional process, which may take as long as 20 seconds or more, there can be no relative motion between the workpiece and the scarfing apparatus, since relative motion would prevent the band from becoming preheated to the required temperature. This period during which there can be no relative motion makes such conventional starts impractical for spot scarfing individual defects, because the frequent need to stop the relative motion for preheating would cause the spot scarfing operation to take too long if several defects had to be scarfed. Furthermore, if several scarfing units are arranged side-by-side to make a gang pass over the surface of the workpiece, stopping relative motion to make a start with one unit, while another unit is making a scarfing cut, would cause the scarfing stream of the unit making the cut to gouge an unacceptably deep groove in the workpiece during the period of no relative motion.

U.S. Pat. Nos. 3,991,985 and 3,996,503, as well as 4,038,108 describe methods and apparatus for instantaneously starting a scarfing reaction without stopping for preheating. While these inventions represent significant advances in the art, they both have the disadvantge of requiring relatively expensive and complicated equipment. The apparatus of U.S. Pat. Nos. 3,991,985 and 3,996,503 requires a wire feeding mechanism, and that of U.S. Pat. No. 4,038,108 requires a laser. Moreover, both of the inventions require starting a new reaction each time a scarfing cut is to be made, thereby necessitating frequent use of the wire feeder or laser.

OBJECTS

Accordingly, it is an object of this invention to provide a method and apparatus for spot scarfing the surface of a workpiece without interrupting the normal relative speed of travel between the workpiece and the apparatus, and without use of a wire feeder or laser.

SUMMARY OF THE INVENTION

These and other objects which will become apparent to those skilled in the art are achieved by the present invention, one aspect of which comprises: a process for spot scarfing the surface of a metal workpiece comprising:

(a) impinging a stream of pilot oxygen gas upon a portion of the workpiece which is at least at its oxygen ignition temperature thereby providing a thermochemical reaction;

(b) causing relative motion between the workpiece and the stream of pilot oxygen gas, so as to continuously produce a pilot puddle of molten metal having a width of about 10 to 30 mm along a chosen path on the surface of the workpiece;

(c) contacting the pilot puddle with a stream of oxygen gas having a first intensity higher than the intensity of a stream of scarfing oxygen gas so as to spread the puddle to a preselected width of about 100 to 300 mm when the puddle reaches an area to be spot scarfed on the workpiece;

(d) reducing the first intensity of said stream of oxygen gas of step (c) to a second intensity of up to the intensity of the stream of scarfing oxygen gas upon the puddle being spread to the preselected width; and (e) scarfing the area by impinging the stream of scarfing oxygen gas on the spread puddle.

The portion of the workpiece upon which the stream of pilot oxygen gas is impinged is preferably at its melting temperature.

A second aspect of the present invention comprises an apparatus for spot scarfing a metal workpiece comprising:

(a) a scarfing unit comprising:
  (i) an upper preheat block having a lower surface;
  (ii) a lower preheat block having an upper surface positioned below the lower surface of the upper preheat block and spaced therefrom to form a slot-like nozzle for directing a sheet-like stream of oxygen gas at scarfing intensity at the workpiece surface;

(b) pilot oxygen nozzle means with a central axis directed to intersect the workpiece surface at an acute angle for discharging a stream of pilot oxygen gas at the workpiece surface to form a pilot puddle thereon;

(c) blowpipe means having a discharge orifice with a shape factor of from $4\pi$ to about 25 and with a central axis directed to intersect the workpiece surface at an acute angle for discharging a stream of oxygen gas having a first intensity higher than the scarfing oxygen intensity and being directed at the pilot puddle on the workpiece surface; and (d) means for reducing the first intensity of the stream of oxygen gas of (c) to a second intensity of up to the scarfing oxygen intensity.

This invention is predicated on the discovery that a very narrow pilot puddle can be sustained on the surface of a workpiece moving at normal scarfing speed with a low-intensity stream of oxygen gas, and that the size of the pilot puddle can be expanded suddenly to the full width of a desired scarfing cut by directing a high intensity stream of oxygen at the pilot puddle. After the pilot puddle has been expanded to the desired width, the area of the workpiece sought to be spot scarfed is scarfed with a stream of scarfing oxygen gas. In sustaining the pilot puddle, i.e. in continuously producing a pilot puddle of molten metal along a chosen path on the surface of the workpiece, a very narrow and shallow cut will be made on the surface of the workpiece. However, this "pilot cut" is so small that very little metal is wasted, and the pilot cut itself will not become an undesirable surface defect.

The term "high intensity stream of oxygen", as used throughout the present specification and claims, is intended to mean a stream of oxygen having an intensity higher than that of the stream of scarfing oxygen. Contacting the pilot puddle with such a stream will abruptly broaden the width of the puddle to a preselected width; preferably, that of the desired scarfing cut.

The term "stream of pilot oxygen" as used in the specification and claims is intended to mean a stream of oxygen gas whose width is substantially narrower than the width of a desired scarfing cut.

The term "stream of scarfing oxygen" is used herein, is intended to mean a stream of oxygen gas having scarfing oxygen intensity for the purpose of thermochemically removing defects from said surface.

THE DRAWINGS

FIG. 1 is a side view illustrating scarfing apparatus in accordance with the present invention capable of sustaining a pilot puddle and of suddenly expanding same to a preselected width.

FIG. 1A is a partial front view of the apparatus of FIG. 1 taken along line 1A—1A.

FIG. 2 is partial front view of the apparatus of FIG. 1, taken along line 2—2.

FIG. 3 illustrates the manner in which spot scarfing cuts can be made on the surface of a workpiece utilizing the apparatus of FIGS. 1 and 2.

Figure 10:
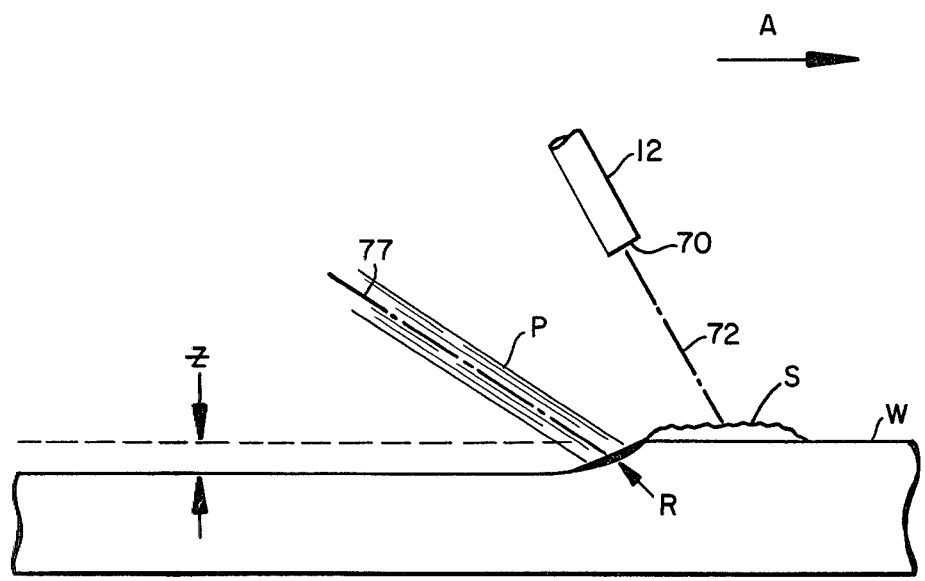

FIG. 10 schematically illustrates a pilot oxygen thermochemical reaction on the surface of a metal workpiece in accordance with a particular embodiment of the present invention.

DETAILED DESCRIPTION OF THE INVENTION

FIGS. 1 and 2 illustrate a preferred embodiment of the invention. Typically, a scarfing unit U is comprised of a head 1, a shoe 2, an upper preheat block 3, and a lower preheat block 4. A slot-like scarfing nozzle 9, from which a sheet-like stream of scarfing oxygen is discharged, is formed by the upper surface 7 of lower preheat block 4 being positioned below and spaced from the lower surface 8 of upper preheat block 3. Shoe 2 rides on the surface of workpiece W, maintaining constant distances between the work surface and the scarfing unit U. Oxygen and fuel gas are supplied to the unit U by pipes 5 and 6, respectively, and thereafter to the various appropriate nozzles by conventional passages and flow control means (not completely shown) well known to those skilled in the art. Rows of ports 10 and 16 (see FIG. 2) in upper preheat block 3 discharge fuel gas and oxygen, respectively. A row of ports 11 in lower preheat block 4 discharge fuel gas.

Conduit $C_p$ supplies oxygen to pilot oxygen nozzle 14 (see FIG. 2), which discharges a narrow stream of pilot oxygen gas to sustain the pilot puddle. Pilot oxygen nozzle 14 is located within scarfing oxygen slot nozzle 9. Conduit $C_s$ supplies oxygen to the parts of scarfing oxygen slot nozzle 9 located outside of pilot oxygen nozzle 14, and valves $V_3$ and $V_4$ control the flow of pilot oxygen and scarfing oxygen respectively. There may be more than one oxygen supply conduit conveying oxygen to the scarfing unit, and valves $V_3$ and $V_4$ may be located external to the scarfing unit.

Blowpipe 12 discharges a high intensity stream of oxygen to spread the pilot puddle sustained by nozzle 14 to the width desired for a scarfing cut. In this embodiment, blowpipe 12 is mounted external to scarfing unit U, e.g. by means of bracket 80 attaching it to head 1.

For the purposes of the specification and claims, the "shape factor" of a planar geometric figure is hereby defined as the ratio between the square of its perimeter and the area within said perimeter; e.g., the shape factor for a circle equals $\pi^2 d^2$ divided by $0.25\pi d^2$, i.e. $4\pi$. For reasons hereinafter discussed, the high intensity stream of oxygen discharged from blowpipe 12 should have a cross-sectional shape normal to its central axis such that its shape factor is from $4\pi$ to 25, with $4\pi$ being preferred. The discharge orifice 70 of high intensity blowpipe 12 should accordingly have a shape factor of from $4\pi$ to 25 and preferably a shape factor of $4\pi$.

The extension 72 of the central axis 71 of high intensity blowpipe 12 lies in a plane which is perpendicular to the surface of the workpiece W and preferably parallel to the direction of scarfing travel (arrow A in FIGS. 1 and 10). The extension 72 advantageously is at an acute angle $\alpha$ with the workpiece suface of between about 30° to 80°; and preferably between about 50° to 60°. Accordingly, the central axis of the high intensity stream of oxygen gas (which is substantially coincident with the extension 72) likewise is at an angle of about 30° to 80° (preferably 50° to 60°) with respect to the workpiece suface.

The extension 77 of the central axis 76 of the pilot oxygen nozzle 14 lies in a plane which is perpendicular to the surface of the workpiece W and parallel to the direction of scarfing travel and advantageously is at an acute angle $\beta$ with the workpiece surface of between about 15° to 80° (preferably 30° to 35°). Accordingly, the central axis of the narrow stream of pilot oxygen (which is substantially coincident with the extension 77) likewise is at an angle of about 15° to 80° (preferably 30° to 35°) with respect to the workpiece surface. The extension 72 of the central axis 71 of the blowpipe 12 preferably lies in substantially the same plane as does the above mentioned extension 77 of central axis 76 of pilot nozzle 14.

Although not essential to the practice of the present invention, it is advantageous for the plane in which the central axes of the high intensity stream of oxygen and the narrow stream of pilot oxygen preferably lie to be substantially coincident with a plane which contains the lateral centerline C—C of slot-like nozzle 9 as shown in FIG. 2.

It is preferable that upper preheat block 3 be designed to produce a post-mixed preheating flame in accordance with Fuhrhop, U.S. Pat. No. 4,115,154, the entire disclosure of which is incorporated herein by reference.

The functioning of the apparatus is best understood with reference to FIG. 3, which illustrates typical spot scarfing cuts made on the surface of a workpiece by the apparatus described in FIGS. 1 and 2.

In FIG. 3, scarfing cuts 23 and 25 would be made as follows. The end 20 of workpiece W is moved into register with scarfing unit U, (at the opposite end of the workpiece from that shown in the drawing) and relative motion between the workpiece and scarfing unit is stopped for the first and only time during the spot scarfing process. Fuel and oxygen gas are discharged from ports 10 and 16 and ignited, forming a preheat flame that impinges upon the samll area 21 on the end 20 of the workpiece. The flame preheats portion 21 (P in FIG. 1) to at least its oxygen ignition temperature, preferably to its melting temperature. A narrow stream of pilot oxygen, directed at the heated portion 21, is then caused to be discharged from pilot nozzle 14 by partially opening valve $V_3$. The pilot oxygen reacts exothermically with the heated portion 21 of the workpiece forming a molten puddle. Relative motion at normal scarfing speed is commenced between the scarfing unit U and the workpiece W. The scarfing unit passes over the workpiece in the general direction of arrow A. The pilot oxygen stream continuously produces a pilot puddle of molten metal along chosen path 22 of the surface of workpiece W. Flames formed by igniting gases discharged from nozzles 16, 10 and 11 can be used to help sustain the pilot puddle, although such flames are not necessary.

When the pilot puddle reaches area 23, which contains a defect to be scarfed, the following sequence of events takes place without interruption of the relative motion. Blowpipe 12 is caused to discharge a high intensity stream of oxygen which impinges upon pilot puddle 22. The pilot puddle is abruptly spread to width X, a preselected width equal to that of the desired scarfing cut. A stream of scarfing oxygen is caused to be simultaneously discharged from slot nozzle 9 onto the spread puddle by opening valve $V_4$, and fully opening valve $V_3$ so that the oxygen flow from nozzle 14 is increased from the pilot oxygen intensity to scarfing intensity. As relative motion continues in the direction of arrow A, area 23 is scarfed out. Preheat flames discharged from ports 11 help sustain the scarfing reaction.

After the high intensity stream of oxygen gas discharged from blowpipe 12 spreads the pilot puddle to the preselected width, the high intensity stream of oxygen gas is advantageously reduced to at least scarfing oxygen intensity, although it may be satisfactorily reduced to any value ranging from scarfing oxygen intensity to zero (i.e., turned off). In other words, the pilot puddle is contacted with a stream of oxygen gas having a first intensity higher than the intensity of the stream of scarfing oxygen gas to spread the pilot puddle to the preselected width. Upon the pilot puddle being spread to the preselected width, the first intensity (i.e. high intensity) is reduced to a second intensity which may range from zero up to the intensity of the scarfing oxygen gas. Advantageous intensities for the high intensity stream of oxygen gas (i.e. the first intensity) discharged from blowpipe 12, the stream of scarfing oxygen gas, and the stream of pilot oxygen gas are hereinafter disclosed.

The first and second intensities of the stream of oxygen gas discharge from blowpipe 12 may be controlled, for example, by a valve $V_1$ (FIG. 1). Valve $V_1$ could, for example, suitably be automated to operate through a series of sequence timers, relays, and solenoid valves (not shown) in a manner well known to the art so that an operator or an appropriate signal will initiate the impingement of the high intensity stream of oxygen gas when the pilot puddle reaches an area to be spot scarfed and the described sequence of events will be automatically carried out.

The high intensity stream of oxygen gas is reduced to at least the intensity of the stream of scarfing oxygen or turned off upon the pilot puddle being spread to the preselected width, since continued discharge of the high intensity stream of oxygen from blowpipe 12 would tend to additionally spread the already spread puddle and produce undesirable fins at the lateral edges of the scarfing cut; undesirable gouging and irregularities on the surface of the scarfing cut would also result from such continued discharge. Furthermore, savings are achieved in the use of oxygen gas.

If a scarfing cut having a substantially uniform surface is desired, the intensity of the high intensity stream of oxygen gas would be reduced to substantially zero, i.e. turned off, and a uniform, sheet-like stream of scarfing oxygen, such as provided by a slot-like nozzle, would be used for scarfing.

The discharge of the scarfing oxygen gas may be commenced upon the spreading of the pilot puddle to the preselected width. Alternately, the scarfing oxygen stream may be turned on at the same time as the high intensity stream of oxygen gas; the high intensity stream of oxygen gas will have more impact and will control the course of the thermochemical reaction, i.e. will cause the pilot puddle of molten metal to rapidly spread to the preselected width. Then, as the high intensity stream of oxygen gas is reduced to at least scarfing intensity or turned off, the scarfing oxygen stream will take over the reaction in rapid manner.

After scarfing cut 23 has been made, the scarfing oxygen of nozzle 9 is turned off by closing valve $V_4$ and partially closing valve $V_3$ so that the flow of oxygen from nozzle 14 is reduced to pilot oxygen stream intensity. The stream of oxygen gas discharged from high intensity blowpipe 12 is also turned off if this has not already been done. Hot or molten metal remains at edge 23A of cut 23. Pilot oxygen from nozzle 14 impinges upon the hot or molten edge 23A and a pilot puddle is sustained along chosen path 24, in the same manner as for path 22. The path along which the pilot puddle is continuously produced does not have to be a straight line, but may follow any chosen path on the work surface. When area 25, containing another defect, is reached, the pilot puddle is spread suddenly by a high intensity stream of oxygen discharged from blowpipe 12, and area 25 is scarfed by again fully opening valves $V_3$ and $V_4$. After this second scarfing cut has been made, the pilot puddle 26 may be sustained by oxygen from nozzle 14 until the scarfing unit has passed over the workpiece.

Preferably, pilot puddles of about 10 to 30 mm wide are spread to a preselected width of about 100 to 300 mm in accordance with the practice of the present invention for reasons hereinafter described.

The apparatus illustrated in FIGS. 1 and 2 may be mounted to individually spot scarf defects located anywhere on the surface of a workpiece. An example of such mounting appears in FIG. 7 of U.S. Pat. No. 3,991,985. If an individual fin-free cut is desired, the scarfing method disclosed in U.S. Pat. No. 4,040,871, may be used.

For best results, the intensity and width of the stream of pilot oxygen gas discharged from nozzle 14 should be just sufficient to sustain the pilot puddle. In this manner, very little metal will be removed from the path followed by the pilot puddle. With the apparatus illustrated in FIGS. 1 and 2, it is preferable that the discharge opening of pilot oxygen nozzle 14 be a square measuring about 6 mm per side.

FIG. 10 illustrates a typical pilot oxygen thermochemical reaction in progress on the surface of a metal workpiece W. A stream of pilot oxygen P impinges the workpiece at an acute angle, sustaining a high temperature exothermic reaction at reaction zone R. Molten metal and oxide slag, e.g. molten iron and molten iron oxide, are continuously pushed forward of the reaction zone R by the impact of pilot oxygen stream P, removing metal from the surface of the workpiece to a depth represented by Z. A typical depth of metal removal may be from 1.5 to 2 mm.

The high intensity stream of oxygen gas for spreading the pilot puddle to the preselected width may impinge upon the surface of the workpiece behind (i.e. opposite the direction of arrow A) the reaction zone R, e.g. up to 15 cm behind R; in the reaction zone R; or in the molten metal and oxide slag S forward of the reaction zone R.

FIG. 10 schematically represents an embodiment of the present invention wherein the extension 72 of central axis 71 of high intensity blowpipe 12 is directed so that the high intensity stream of oxygen gas (i.e. the first intensity) discharged from blowpipe 12 contacts the pilot puddle forward (direction of arrow A) of the reaction zone R. Hence, in this embodiment of the present invention, the central axis 71, and its extension 72, of the blowpipe 12 is directed to intersect the surface of the workpiece forward of the central axis 76, and its extension 77, of the pilot oxygen nozzle 14 (not shown in FIG. 10).

If the initial temperature of the workpiece is below 760° C., the pilot oxygen stream intensity should be within the range of 40 to 70 SCMH/cm$^2$ of nozzle discharge area; preferably, it should be about 65 SCMH/cm$^2$. If the workpiece temperature is above 760° C., the pilot oxygen stream intensity should be from 30 to 45 SCMH/cm$^2$ of nozzle discharge area; preferably, about 40 SCMH/cm$^2$. At these intensities, a 6 mm square pilot nozzle arranged as shown in FIGS. 1 and 2 will produce a pilot puddle about 10 to 20 mm wide. The greater the distance between the workpiece and the mouth of the pilot oxygen nozzle, the greater the pilot oxygen stream intensity required. Different arrangements for the pilot oxygen nozzle are discussed later with regard to FIGS. 4, 5, 6 and 9.

When initial workpiece temperature is below 760° C., the high intensity stream of oxygen should preferably have an intensity of from 100 to 200 SCMH/cm$^2$ of nozzle discharge area, with about 115 SCMH/cm$^2$ being most preferred. It has been found in this instance, i.e., when initial workpiece temperature is less than 760° C., that an intensity of 115 SCMH/cm$^2$ discharged from a blowpipe of 20 mm diameter will spread a pilot puddle to a width of about 100 mm. For many applications, a spot scarfing cut of this width will be sufficient; however, if a wider cut is desired, a 35 mm diameter blowpipe discharging at 115 SCMH/cm$^2$ will spread a pilot puddle to a width of about 200 mm; or a 45 mm diameter blowpipe will spread it to a width of about 300 mm. The intensity of the high intensity stream of oxygen should preferably be from 70 to 150 SCMH/cm$^2$ of nozzle discharge area when the workpiece temperature is above 760° C. with 95 SCMH/cm$^2$ being most preferred. In this case, i.e., when initial workpiece temperature is above 760° C., said intensity of 95 SCMH/cm$^2$ discharged from a 20 mm diameter blowpipe will spread a pilot puddle to a width of about 100 mm, and if discharged from a 35 mm or 45 mm diameter blowpipe it will spread a pilot puddle to a width of about 200 mm or 300 mm, respectively.

Scarfing oxygen stream intensity should preferably be from 40 to 100 SCMH/cm$^2$ of nozzle discharge area when scarfing workpieces having an initial temperature below 760° C., with about 85 SCMH/cm$^2$ being most preferred. When initial workpiece temperature is above 760° C., scarfing oxygen stream intensity should preferably be from 45 to 70 SCMH/cm$^2$, with 55 SCMH/cm$^2$ being more preferred.

The spreading of the pilot puddle takes place suddenly, i.e. almost instantaneously, and is independent of the pilot puddle width. As an example, if the relative motion between the workpiece and the scarfing apparatus is about 6 meters/minute, the initial temperature of the steel is below 760 degrees C. (cold steel), and the pilot puddle is from 10–30 mm wide, a high intensity stream of oxygen discharged from a blowpipe of 35 mm in diameter having an intensity of 115 SCMH/cm$^2$ can spread the pilot puddle to a selected width (dimension X in FIG. 3) of 200 mm in a distance T (FIG. 3) of about 100 mm and the time interval for spreading of the pilot puddle to the selected width would be about 1 second. Similarly, if the relative motion were increased to about 20 meters/minute, the pilot puddle can be spread to a width of 200 mm (dimension X in FIG. 3) in a distance T (FIG. 3) of about 200 mm and the time interval for spreading of the pilot puddle to the selected width in this instance would be about 0.6 seconds. This constitutes an extremely rapid spreading of the pilot puddle on cold steel. When scarfing steel which has an initial temperature above 760° C., (hot steel), dimension T and the time interval for spreading will be shorter.

As hereinbefore described, the high intensity oxygen stream discharged from blowpipe 12 should have a cross-sectional shape normal to its central axis such that its shape factor is between $4\pi$ to about 25, with $4\pi$ being preferred. A high intensity oxygen stream having such a cross sectional geometry is required in order to achieve the hereinbefore described rapid spreading of a pilot puddle having a width of about 10 to 30 mm to a preselected width of about 100 to 300 mm. Use of other cross sectional geometries, such as a high intensity blowpipe with an elongated discharge orifice, will not result in the rapid spreading of the pilot puddle in accordance with the present invention.

All the preheat ports 10 and 16 may be used to perform the preheating, or the scarfing unit may be provided with control means (not shown) so that only the preheat ports located near nozzle 14 are used for preheating. A pre-mixed flame, that is, a flame formed by igniting oxygen and fuel gas that have been mixed within the scarfing unit may be used. However, it is preferable for purposes of greater safety to use a post-mixed flame, wherein oxygen and fuel gas are mixed outside the unit. Acceptable post-mixed preheating methods and apparatus are disclosed by Allmang and Lytle in U.S. Pat. Nos. 3,231,431 and 3,752,460. As previously mentioned, the method of Fuhrhop's U.S. Pat. No. 4,115,154, is preferred for producing a post-mixed flame. However, any method of heating a portion of the surface of the workpiece to its oxygen ignition temperature or melting temperature can be used, be it an electrical arc, or any other energy concentrating system.

Figure 4:
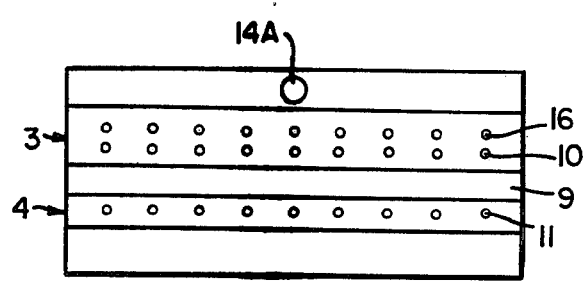
FIGS. 4-6 illustrate alternative embodiments of the pilot oxygen nozzle used in the present invention.
Figure 5:
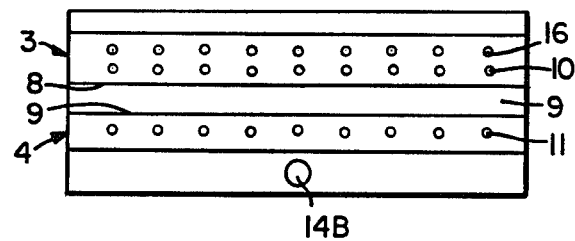
Figure 6:
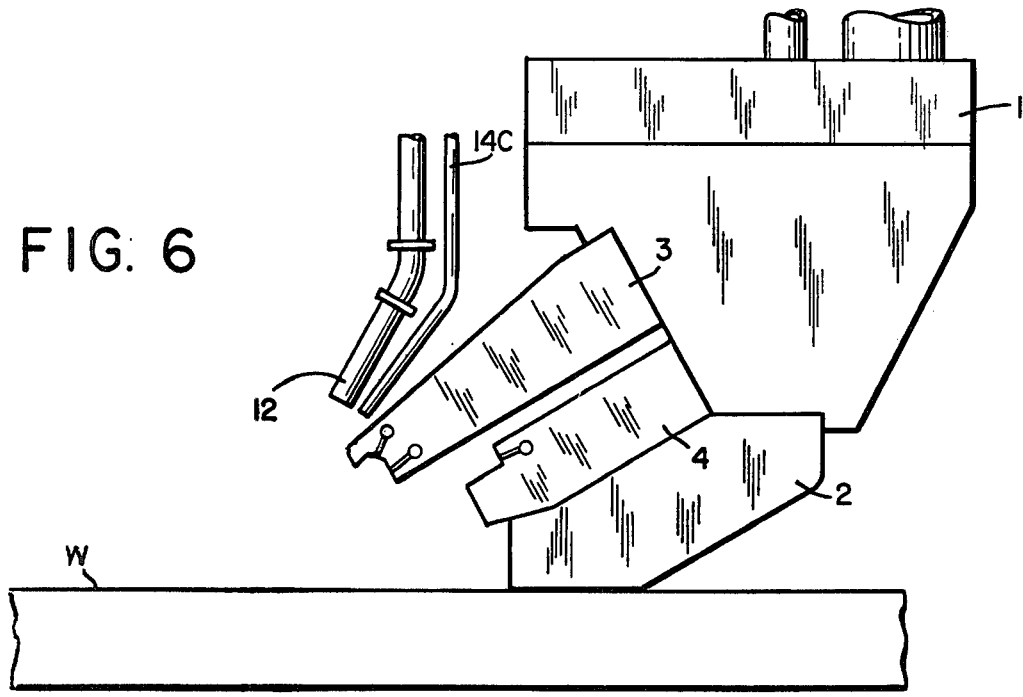

FIGS. 4 to 6 illustrate alternate preferred arrangements for supplying pilot oxygen gas to the surface of the workpiece. In FIG. 4 pilot oxygen nozzle 14A is located within upper preheat block 3. The apparatus illustrated in FIG. 5 has the pilot oxygen nozzle 14B located within lower preheat block 4.

FIG. 6 is a side view illustrating still another arrangement for providing pilot oxygen. In FIG. 6, the pilot oxygen nozzle is a pipe 14C, located external to the scarfing unit and above upper preheat block 3. Any nozzle arrangement capable of suppling pilot oxygen to a suitably located heated portion on the surface of the workpiece may be used.

Figure 9:
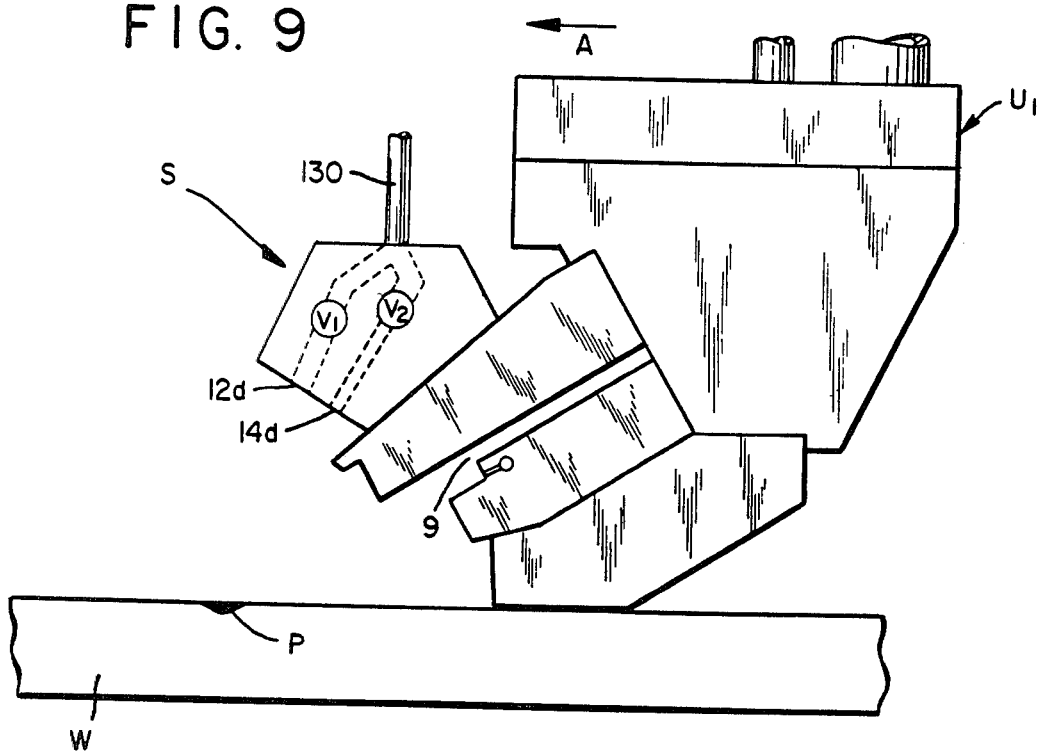
FIG. 9 illustrates a sub-assembly useful for converting conventional scarfing apparatus to enable it to carry out the method of the present invention.

Two or more scarfing units constructed in accordance with the present invention may be mounted parallel to each other to make a "gang pass", i.e. simultaneous parallel passes by several scarfing units, over the workpiece. Nozzles so arranged may be mounted on a gantry as illustrated in FIG. 9 of U.S. Pat. No. 3,991,985. If fin-free cuts are desired, the gang-pass-mounted nozzles may be of the type disclosed in U.S. Pat. No. 4,013,486.

The method and apparatus of the present invention are advantageously adaptable for use with two or more scarfing units mounted in a gang-pass arrangement.

In the preferred practice of the present invention, a pilot puddle having a preferred width of about 10 to 30 mm is contacted by the high intensity stream of oxygen gas and rapidly spread to a preferred width of about 100 to 300 mm as hereinbefore described. The following advantageous results are achieved. Spot scarfing starts are obtainable without having to interrupt relative motion between the workpiece and the scarfing apparatus. This result is of particular importance in gang-pass spot scarfing as is hereinafter described. The very narrow pilot puddle of about 10 to 30 mm in width results in minimal loss of good metal on the workpiece surface. The minimum width of the pilot puddle is about 10 mm since a pilot puddle of a narrower width would be difficult to continuously maintain on the workpiece surface. The maximum width of the pilot puddle is about 30 mm since a greater width would result in unnecessary waste of good metal without any countervailing advantages. The use of a pilot puddle of such narrow width is possible because, in accordance with the present invention, it has been discovered that the hereinbefore described high intensity stream of oxygen gas having a cross sectional shape normal to its central axis such that its shape factor is between $4\pi$ and about 25 will spread the narrow pilot puddle to a preselected width of about 100 to 300 mm. Wide pilot puddles are unnecesssary since, as hereinbefore described, it has been discovered that the rapid spreading of the pilot puddle to widths of about 100 to 300 mm using the high intensity stream of oxygen gas of the present invention is independent of the pilot puddle width. Spread puddle widths of about 100 to 300 mm would be used to scarf defects having a width equal to or less than the width of the spread puddle by means of a scarfing nozzle discharging a stream of scarfing oxygen having substantially the width of the spread puddle. If a defect is encountered which is wider than the preselected width of the spread puddle, an adjacent gang-mounted scarfing apparatus constructed in accordance with the present invention would be simultaneously employed as hereinafter described. Scarfing widts of about 100 to 300 mm are advantageous in gang pass scarfing arrangements, since defects having a narrow width may be scarfed without unnecessary loss of good metal adjacent to the defect whereas wider defects may be scarfed by using two or more adjacent gang-mounted scarfing units as required. Accordingly, the present invention is readily and advantageously adaptable for use with scarfing units mounted in gang-pass arrangement. The present invention achieves scarfing starts having a scarfing width commonly and advantageously used in a gang-pass spot scarfing arrangement without the need to interrupt the relative motion between the workpiece and the gang-pass scarfing apparatus arrangement, and in a simple, reliable manner, without the need of complex equipment. Moreover it achieves such starts in a manner which minimizes good metal loss on the workpiece surface.

It will be readily appreciated that the rapid spreading of the narrow pilot puddle by the high intensity oxygen stream in accordance with the present invention is also of critical importance. If the spreading were slow, the spreading operation would have to begin well in advance of a defect area to be scarfed. Accordingly, good metal would be wasted during the spreading process.

Figure 7:
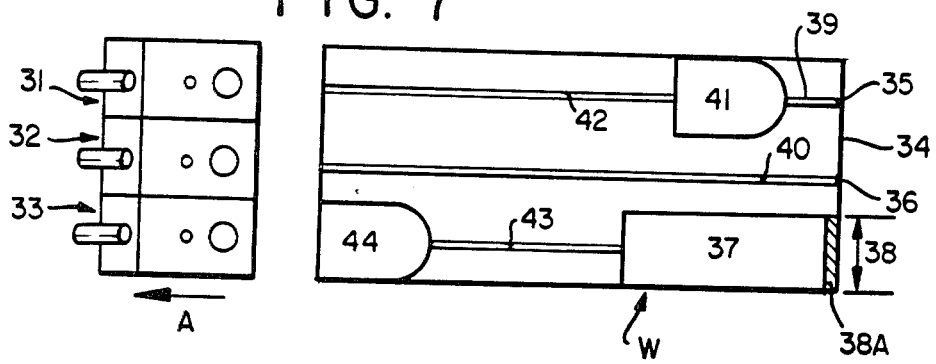
FIG. 7 illustrates spot scarfing cuts made in accordance with the present invention when using several scarfing units mounted side-by-side in a "gang pass" arrangement.

FIG. 7 illustrates scarfing cuts made by apparatus comprising 3 units (31, 32 and 33) mounted side-by-side for a gang-pass over workpiece W. Scarfing units 31, 32 and 33 are constructed like those illustrated in FIGS. 1 and 2 and function in the same manner. FIG. 7 illustrates the position of the apparatus after the scarfing operation has been completed. The scarfing takes place as follows: edge 34 of workpiece W is positioned in register with the three scarfing units. Portions 35 and 36 of edge 34 are heated to at least oxygen ignition temperature by units 31 and 32 respectively, as described previously. Since an area 37 containing a defect is located close to edge 34, flames discharged from ports 10 and 16 of unit 33 heat band 38A on the surface at edge 34 to its oxygen ignition temperature over width 38, equal to the full width of the desired scarfing cut. All 3 units accomplish heating of their respective portions of the surface of the workpiece bordering edge 34 is simultaneously. Then the pilot oxygen streams of scarfing units 31 and 32 and the scarfing oxygen stream of unit 33 are turned on, and the units are moved along the workpiece in the direction of arrow A at scarfing speed. The pilot oxygen streams from units 31 and 32 sustain pilot puddles along paths 39 and 40, while unit 33 makes scarfing cut 37 with a stream of scarfing oxygen. When area 41 is reached, unit 31 is turned on and suddenly spreads its pilot puddle with its high intensity blowpipe to the width of the desired scarfing cut and scarfs area 41. After area 41 has been scarfed, the scarfing oxygen stream of unit 31 is turned off, but the pilot oxygen stream is left on, sustaining a pilot puddle along path 42. After area 37 has been scarfed, the scarfing oxygen of unit 33 is turned off, leaving the pilot oxygen on to sustain the pilot puddle along path 43. When area 44 is reached, unit 33 suddenly spreds its pilot puddle to the desired width and area 44 is scarfed. Since there is no defect in the surface passed over by unit 32, that unit performs no scarfing during the entire pass.

It is important to note that, after relative motion starts between the scarfing units and the workpiece, the motion continues uninterrupted at the desired scarfing speed throughout the entire pass. If the motion had to be interrupted, for example to start cut 41, the scarfing oxygen of unit 33 would gouge a deep groove in the workpiece in area 37.

Relative motion between the workpiece and the scarfing apparatus may be along any chosen path, and may be provided by any desired means; either may move while the other is stationary, or both may move simultaneously. The means for producing said motion may be an integral part of the scarfing machinery, for example, as shown in FIGS. 7 and 9 of U.S. Pat. No. 3,991,958, mentioned previously. Alternatively, or in combination with the above, relative motion means external to the scarfing machine may be employed, for example, a steel mill's roll table which moves a workpiece in relation to a scarfing apparatus.

Figure 8:
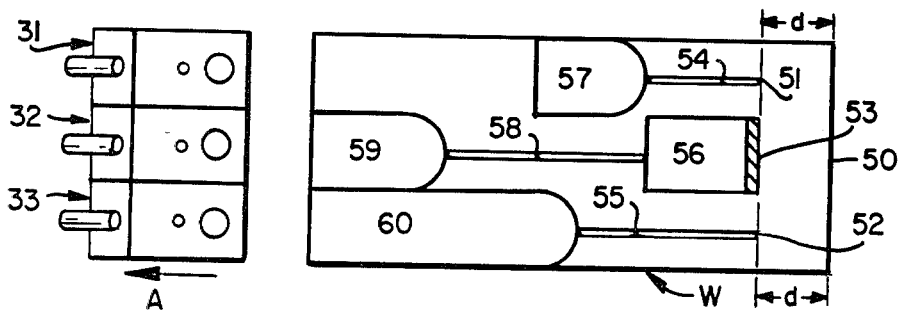
FIG. 8 illustrates "gang pass" scarfing cuts made by a scarfing machine in accordance with the invention that has been programmed to minimize oxygen and fuel gas consumption.

FIG. 8 illustrates a workpiece scarfed by apparatus of the present invention that is programmed to conserve oxygen and fuel gas.

Instead of starting pilot puddles at edge 50, the scarfing apparatus may be positioned at the edge of the first area to be scarfed, area 56, a distance "d" from edge 50 and halted there. While the apparatus is halted, units 31 and 33 preheat portions 51 and 52 and each unit's pilot oxygen is turned on. Simultaneously, a conventional scarfing start is made by unit 32 by preheating area 53 and turning on the scarfing oxygen. Relative motion between the gang pass apparatus and the workpiece is then immediately commenced, sustaining pilot puddles along paths 54 and 55 and making a scarfing cut over area 56. After area 56 has been scarfed, the scarfing oxygen on unit 32 is turned off, leaving pilot oxygen on to sustain a pilot puddle along path 58. When area 57, containing a defect, is encountered, unit 31 spreads its pilot puddle and scarfs the defect. Similarly, unit 33 scarfs area 60 when that area is encountered. After area 57 has been scarfed, unit 31 is turned off completely, since that unit has no further defects to scarf. When area 59 is encountered it is scarfed by unit 32.

The programming method used to control the flows of gases from the various nozzles forms no part of this invention. Such programming could be accomplished manually by an operator who starts and stops gas flow from the appropriate nozzles at the appropriate times. Preferably, the sequences for starting and sustaining the pilot puddle, and for spreading the puddle and scarfing a defect will be carried out automatically by sequencing apparatus. Defect detection apparatus could be used to detect defects and send signals to sequencing apparatus which could cause the defects to be automatically scarfed out of the workpiece. Programming apparatus into which the pattern of defects on a workpiece is pre-recorded before actual scarfing occurs may also be used.

The present invention may be used in conjunction with the instantaneous starting methods disclosed in previously-mentioned U.S. Pat. Nos. 3,996,503 and 4,038,108. A first scarfing cut may be started by either the wire or laser method disclosed by said patents. After a cut has been made, a pilot puddle is sustained in the same way as that which was sustained along path 24 of FIG. 3 for example. Subsequent scarfing cuts are made by spreading the pilot puddle with a high intensity stream of oxygen and scarfing the desired area as described previously. This method has the advantage of not requiring a delay for preheating prior to the first scarfing cut, yet not requiring use of the wire feeder or laser to start subsequent cuts.

FIG. 9 illustrates a sub-assembly useful for enabling conventional scarfing apparatus to carry out the method of the invention. $U_1$ represents any conventional scarfing unit having means (not shown) for preheating a portion of the surface of the workpiece to its oxygen ignition temperature and a scarfing nozzle 9. Sub-assembly S is connected to oxygen supply pipe or source 130. Oxygen is conducted from pipe 130 to pilot oxygen nozzle 14d and high intensity blowpipe 12d. The sub-assembly is shown mounted on scarfing unit $U_1$, such that the oxygen streams discharged from nozzles 12d and 14d in this instance impinge upon the spot on the workpiece preheated by unit $U_1$. The apparatus functions as follows: unit $U_1$ preheats spot P on the surface of the workpiece to its oxygen ignition temperature. Valve $V_2$ has only a small flow opening that allows only a low-intensity stream of oxygen to flow from pilot oxygen nozzle 14d. A small pilot puddle is sustained along a chosen path. A high-intensity stream of oxygen is impinged upon the pilot puddle by opening valve $V_1$ spreading the puddle to a preselected width. Valve $V_1$ has a large flow opening that allows a high-intensity stream of oxygen to flow from nozzle 12d. The defective area if scarfed with a stream of scarfing oxygen discharged from nozzle 9.

Of course, nozzles 12d and 14d may have separate supply pipes, and valves $V_1$ and $V_2$ or other means for controlling the flow of oxygen may be located external to the subassembly.

What is claimed is:

1. A process for spot scarfing the surface of a metal workpiece comprising:
    (a) impinging a stream of pilot oxygen gas upon a portion of the workpiece surface which is at least at its oxygen ignition temperature thereby causing a thermochemical rection for providing a pilot puddle of molten metal on the surface of the workpiece;
    (b) causing relative motion between said workpiece and said stream of pilot oxygen gas, so as to continuously produce said pilot puddle of molten metal having a width of about 10 to 30 mm along a chosen path on the surface of the workpiece;
    (c) contacting said pilot puddle with a stream of oxygen gas having a first intensity higher than the intensity of a stream of scarfing oxygen gas so as to spread the puddle to a preselected width of about 100 to 300 mm when said puddle reaches an area to be spot scarfed on said workpiece;
    (d) reducing said first intensity of said stream of oxygen gas of step (c) to a second intensity of up to the intensity of said stream of scarfing oxygen gas upon said puddle being spread to said preselected width; and
    (e) scarfing said area by impinging said stream of scarfing oxygen gas on the spread puddle.

2. A process as recited in claim 1 wherein said stream of oxygen gas of step (c) having the first intensity has a cross-sectional shape normal to its central axis such that its shape factor is from $4\pi$ to about 25.

3. A process as recited in claims 1 or 2 wherein in step (d) the second intensity of said stream of oxygen gas is substantially zero.

4. A process as recited in claims 1 or 2 wherein the stream of oxygen gas of step (c) having the first intensity contacts said pilot puddle of molten metal forward of the thermochemical reaction.

5. A process as recited in claims 1 or 2 wherein said stream of oxygen gas of step (c) having the first intensity is directed to contact said pilot puddle from a position such that the included angle, measured in a plane perpendicular to the surface of the workpiece, formed by the central axis of said stream and the surface of the workpiece is between about 30° to 80°.

6. A process as recited in claim 5 wherein said plane is parallel to the direction of scarfing.

7. A process as recited in claim 5 wherein said included angle is between about 50° to 60°.

8. An apparatus for spot scarfing a metal workpiece comprising:
   (a) a scarfing unit comprising:
      (i) an upper preheat block having a lower surface;
      (ii) a lower preheat block having an upper surface positioned below said lower surface of said upper preheat block and spaced therefrom to form a slot-like nozzle for directing a sheet-like stream of oxygen gas at scarfing intensity at said workpiece surface;
   (b) pilot oxygen nozzle means with a central axis directed to intersect said workpiece surface at an acute angle for discharging a stream of pilot oxygen gas at said workpiece surface to form a pilot puddle thereon;
   (c) blowpipe means, having a discharge orifice with a shape factor of from $4\pi$ to about 25 and with a central axis directed to intersect said workpiece surface at an acute angle, for discharging a stream of oxygen gas having a first intensity higher than said scarfing oxygen intensity and being directed at said pilot puddle on said workpiece surface; and
   (d) means for reducing said first intensity of said stream of oxygen gas of (c) to a second intensity of up to said scarfing oxygen intensity.

9. An apparatus as recited in claim 8 wherein said discharge orifice of said blowpipe means (c) is circular.

10. An apparatus as recited in claim 8 wherein the acute angle of (c) is between about 30° to 80°.

11. An apparatus as recited in claim 10 wherein the acute angle is between about 50° to 60°.

12. An apparatus as recited in claim 8 wherein the acute angle of (b) is between about 15° to 80°.

13. An apparatus as recited in claim 12 wherein the acute angle is between about 30° to 35°.

14. An apparatus as recited in claim 8 wherein the extension of the central axis of said blowpipe means of (c) is directed to intersect said workpiece surface forward of the central axis of said pilot oxygen nozzle means of (b).

15. An apparatus as recited in claim 8 wherein the extension of the central axis of said blowpipe means of (c) and the central axis of said pilot oxygen nozzle means of (b) define a plane which is perpendicular to the surface of the workpiece and parallel to the direction of scarfing travel.

16. An apparatus as recited in claim 15 wherein said plane passes through the lateral center line of said slot-like nozzle.

17. An apparatus as recited in claim 8 wherein said pilot oxygen nozzle means (b) is located in said upper preheat block (a)(i).

18. An apparatus as recited in claim 8 wherein said pilot oxygen nozzle means (b) is located in said lower preheat block (a)(ii).

19. An apparatus as recited in claim 8 wherein said pilot oxygen nozzle means (b) is located within said slot-like nozzle of (a)(ii).

20. An apparatus as recited in claim 8 wherein said pilot oxygen nozzle means (b) is located external to said scarfing unit (a).

21. An apparatus as recited in claim 8 wherein said blowpipe means (c) is located external to said scarfing unit (a).

22. A process as recited in claims 1 or 2 wherein the stream of oxygen gas of step (c) having the first intensity contacts the surface of the workpiece behind the thermochemical reaction.

23. A process as recited in claims 1 or 2 wherein the stream of oxygen gas of step (c) having the first intensity contacts the thermochemical reaction on the surface of the workpiece.

* * * * *

UNITED STATES PATENT AND TRADEMARK OFFICE
CERTIFICATE OF CORRECTION

PATENT NO. : 4,287,005
DATED : September 1, 1981
INVENTOR(S) : Stephen A. Engel

It is certified that error appears in the above—identified patent and that said Letters Patent is hereby corrected as shown below:

Column 5, line 11, "samll" should read "small"

Column 10, line 58, "spreds" should read "spreads"

Column 11, line 7, "3,991,958" should read "3,991,985"

Signed and Sealed this

Second Day of March 1982

[SEAL]

*Attest:*

*Attesting Officer*

GERALD J. MOSSINGHOFF

*Commissioner of Patents and Trademarks*